United States Patent
Merrill, Sr.

[11] Patent Number: 6,050,137
[45] Date of Patent: Apr. 18, 2000

[54] WHEEL RESTRAINT ASSEMBLY

[75] Inventor: Daniel L. Merrill, Sr., Newaygo, Mich.

[73] Assignee: Burke E. Porter Machinery Company, Grand Rapids, Mich.

[21] Appl. No.: 09/191,860

[22] Filed: Nov. 12, 1998

[51] Int. Cl.[7] .............................................. G01M 17/02
[52] U.S. Cl. ........................................................ 73/146
[58] Field of Search .................................. 73/146, 117.3, 73/126, 127, 117; 410/30; 188/32; 33/203.12, 203.13

[56] References Cited

U.S. PATENT DOCUMENTS

| | | | |
|---|---|---|---|
| D. 236,823 | 9/1975 | Switzer | D12/217 |
| D. 254,432 | 3/1980 | Schessl | D12/217 |
| D. 283,022 | 3/1986 | Cameron | D12/217 |
| D. 328,588 | 8/1992 | Mitchell | D12/217 |
| 2,661,817 | 12/1953 | Mullins | 188/32 |
| 2,822,063 | 2/1958 | Hampton | 188/32 |
| 3,277,702 | 10/1966 | Brenneke | 73/117 |
| 3,458,013 | 7/1969 | Haynes | 187/8 |
| 3,680,369 | 8/1972 | Merrill | 73/117 |
| 3,897,636 | 8/1975 | Leblanc | 33/203 |
| 4,393,694 | 7/1983 | Marten et al. | 73/117 |
| 4,711,325 | 12/1987 | Mountz | 188/32 |
| 4,825,690 | 5/1989 | Mears | 73/117 |
| 5,096,021 | 3/1992 | Tart | 188/32 |
| 5,111,685 | 5/1992 | Langer | 73/117 |
| 5,173,018 | 12/1992 | Kissel et al. | 410/30 |
| 5,231,870 | 8/1993 | Fukuda et al. | 73/117 |
| 5,294,221 | 3/1994 | Eller et al. | 410/30 |
| 5,375,464 | 12/1994 | Dadt | 73/146 |
| 5,402,674 | 4/1995 | Ganzhorn, Jr. et al. | 73/117 |

*Primary Examiner*—William Oen
*Attorney, Agent, or Firm*—Howard & Howard

[57] ABSTRACT

A wheel restraint assembly (10) for securing a wheel (12) of a vehicle (14) to a test platform (16). The restraint assembly (10) includes a wheel chock mechanism (18) with front (20) and rear (22) chocks for engaging and securing the wheel (12) of the vehicle (14). A mount (44) is attached to the test platform (16) some distance away from the chock mechanism (18). The restraint assembly (10) is characterized by an adjustment mechanism (46) interconnecting the chock mechanism (18) and the mount (44) for laterally and transversely moving the chock mechanism (18) in an arcuate path relative to the mount (44). Preferably, the adjustment mechanism (46) includes a pair of parallel link arms (64) interconnecting the chock mechanism (18) to the mount (44). A locking member (78) has a first end mounted to one of the link arms (64) and a second end mounted to the test platform (16). The locking member (78) can be secured to the test platform (16) for selectively preventing the chock mechanism (18) from moving relative to the mount (44). The mount (44) can also be selectively secured to the test platform (16) to prevent further adjustment of the chock mechanism (18).

22 Claims, 5 Drawing Sheets

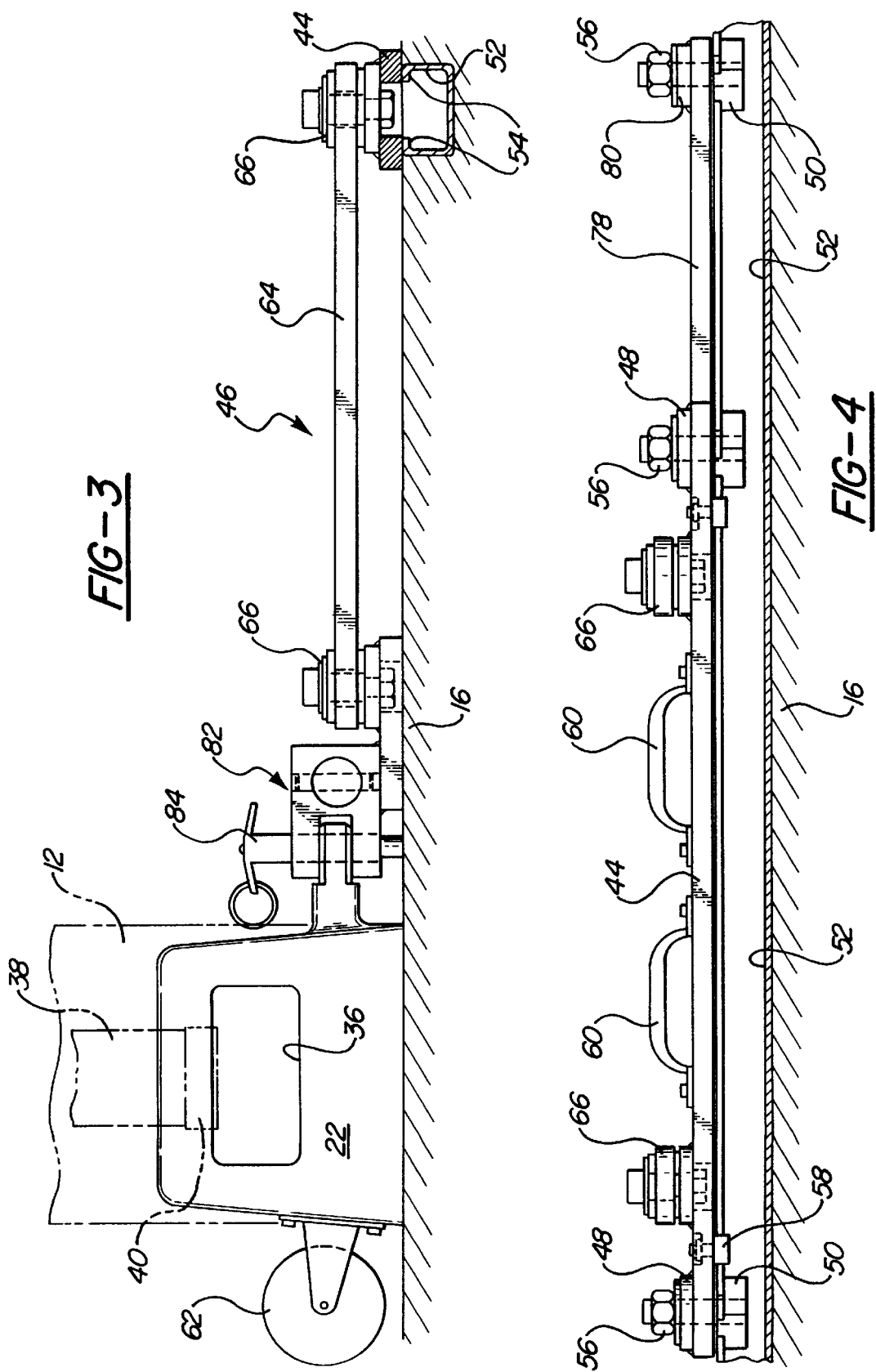

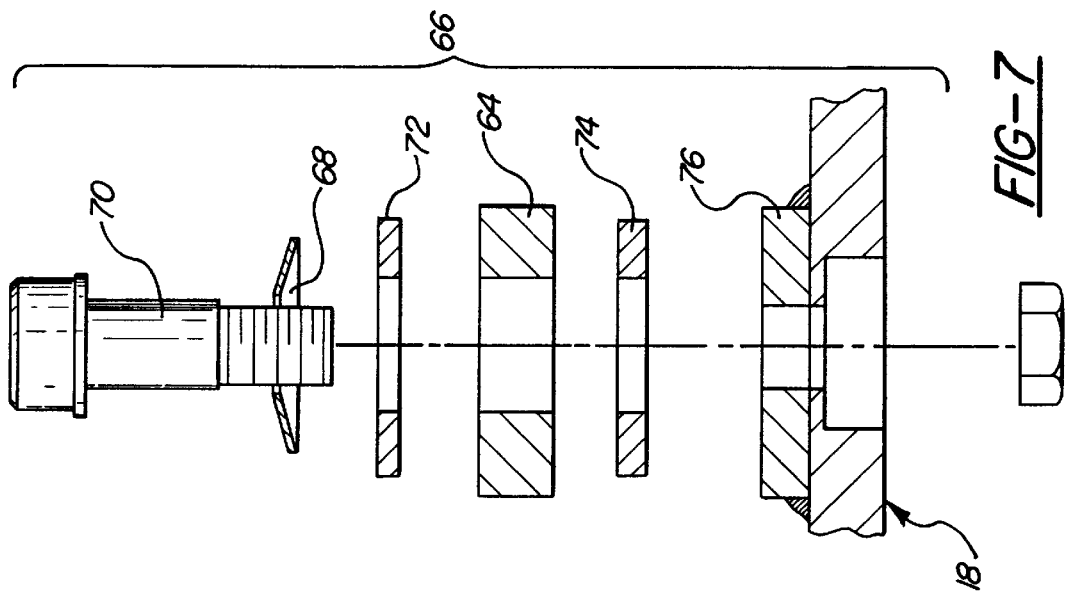
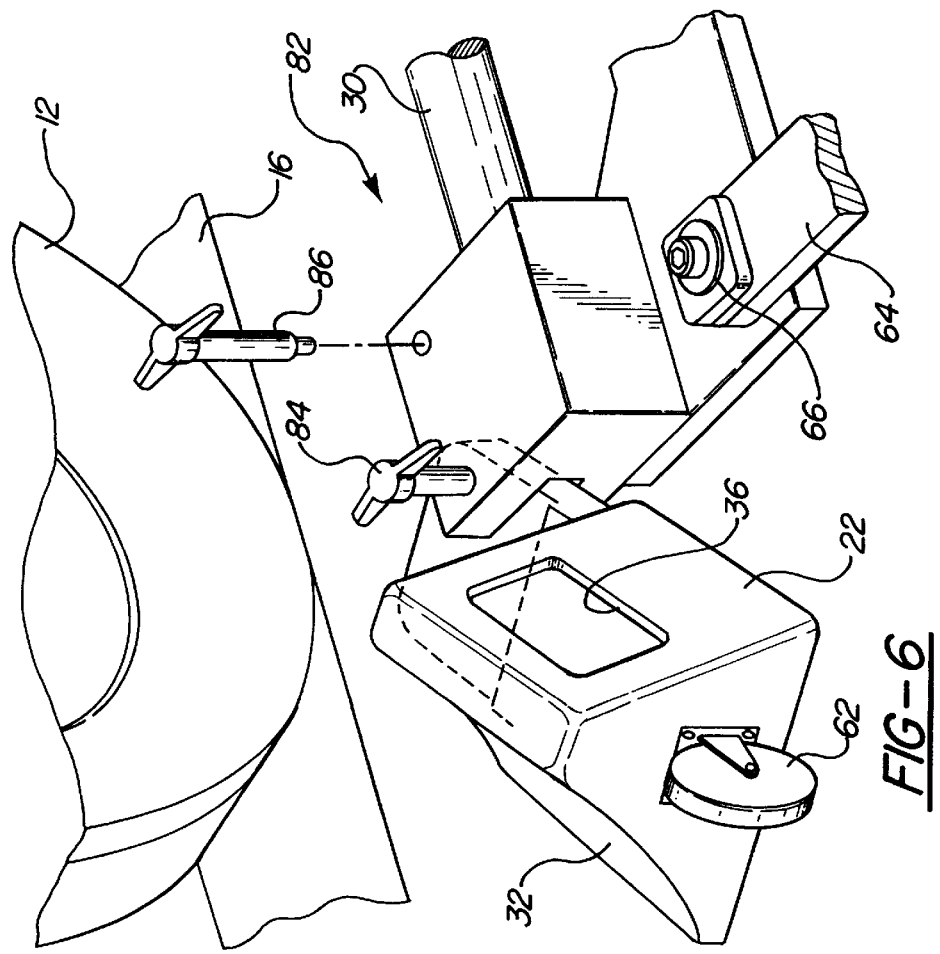

WHEEL RESTRAINT ASSEMBLY

BACKGROUND OF THE INVENTION

1) Technical Field

The subject invention relates to a vehicle wheel restraint for holding a vehicle to a test platform.

2) Description of the Prior Art

Vehicle test platforms are widely used throughout the automotive industry for research, development and performance testing. Typically, the test platforms have a large support structure for supporting the weight of the vehicle. A dynamometer or other suitable testing device is housed within the support structure to measure and record the desired characteristic of the vehicle. The testing of vehicles usually falls into two general types; performance runs to check new vehicles coming off an assembly line or for checking and adjusting vehicles following an overhaul, and durability runs intended to simulate thousands of miles of road service. The durability runs can be used for laboratory development of new automobiles, engines, drivetrains and the like. A typical dynamometer has a large drum which is in contact with the wheels of the vehicle. The dynamometer is controlled to provide appropriate input to the wheels or receive output from the wheels wherein operating profiles of the vehicle can be obtained. Some examples of prior art test platforms are found in U.S. Pat. Nos. 3,277,702 to Brenneke, 4,825,690 to Mears, 5,111,685 to Langer, 5,231,870 to Fukuda et al. and 5,375,464 to Dadt.

As can be appreciated, the vehicle must be securely mounted to the test platform during these test runs. A common means for securing the vehicle is by securing the non-driven wheels to the platform. More specifically, wheel chock mechanisms are typically used to secure the non-driven wheels which in turn secure the vehicle to the test platform. Examples of adjustable wheel chock mechanisms known in the prior art are disclosed in U.S. Pat. Nos. 5,173,018 to Kissel et al. and 5,294,221 to Eller et al. These prior art devices, however, have a number of deficiencies. A primary deficiency is the limited adjustability of the wheel chock mechanisms to accommodate different sized vehicles. Another deficiency relates to providing a removable wheel chock mechanism which can be used on many varied styles of testing equipment. The known prior art designs are specific to a particular test platform.

Most manufacturers of test platforms attempt to produce platforms which can test a variety of different sized vehicles. As known to those in the art, different types, styles, and models of vehicles can have considerably different wheel base lengths, widths and/or tire sizes. Hence, it is desirable to have a wheel chock mechanism with a wide range of adjustment. The prior art devices also have complicated adjustment mechanisms which require significant structural support to hold the vehicle in place. In addition, it may be desirable to remove the wheel chock mechanism from the test platform to position it at another location. The prior art does not disclose an easy and efficient means for quickly removing, transporting, and re-securing the wheel chock mechanisms to the test platform.

SUMMARY OF THE INVENTION AND ADVANTAGES

A restraint assembly for securing a wheel of a vehicle to a test platform. The assembly comprises a wheel chock mechanism including a pair of chocks for selective engagement with the wheel of the vehicle and a mount attached to the test platform. The assembly is characterized by an adjustment mechanism interconnecting the chock mechanism and the mount for laterally and transversely moving the chock mechanism in an arcuate path relative to the mount.

Accordingly, the subject invention provides a wheel chock mechanism having a wide range of adjustability for securing a wide range of different sized vehicles to the test platform. The wheel chock mechanism can retard a significant amount of lateral stresses from the vehicle. The subject invention is also designed with few moving parts such that adjustment is easier and more efficient. In addition, the subject invention can be easily released, transported, and re-secured to the test platform.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a partial cross-sectional side view of the wheel restraint assembly taken along line 3—3 of FIG. 1;

FIG. 4 is a partial cross-sectional side view of the wheel restraint assembly taken along line 4—4 of FIG. 1;

FIG. 6 is an enlarged perspective view of a rear chock shown pivoting away from the wheel of the vehicle; and FIG. 7 is an exploded partially cross-sectional view of a self-locking joint of the wheel restraint assembly.

DETAILED DESCRIPTION OF THE PREFERRED EMBODIMENT

Figure 1:
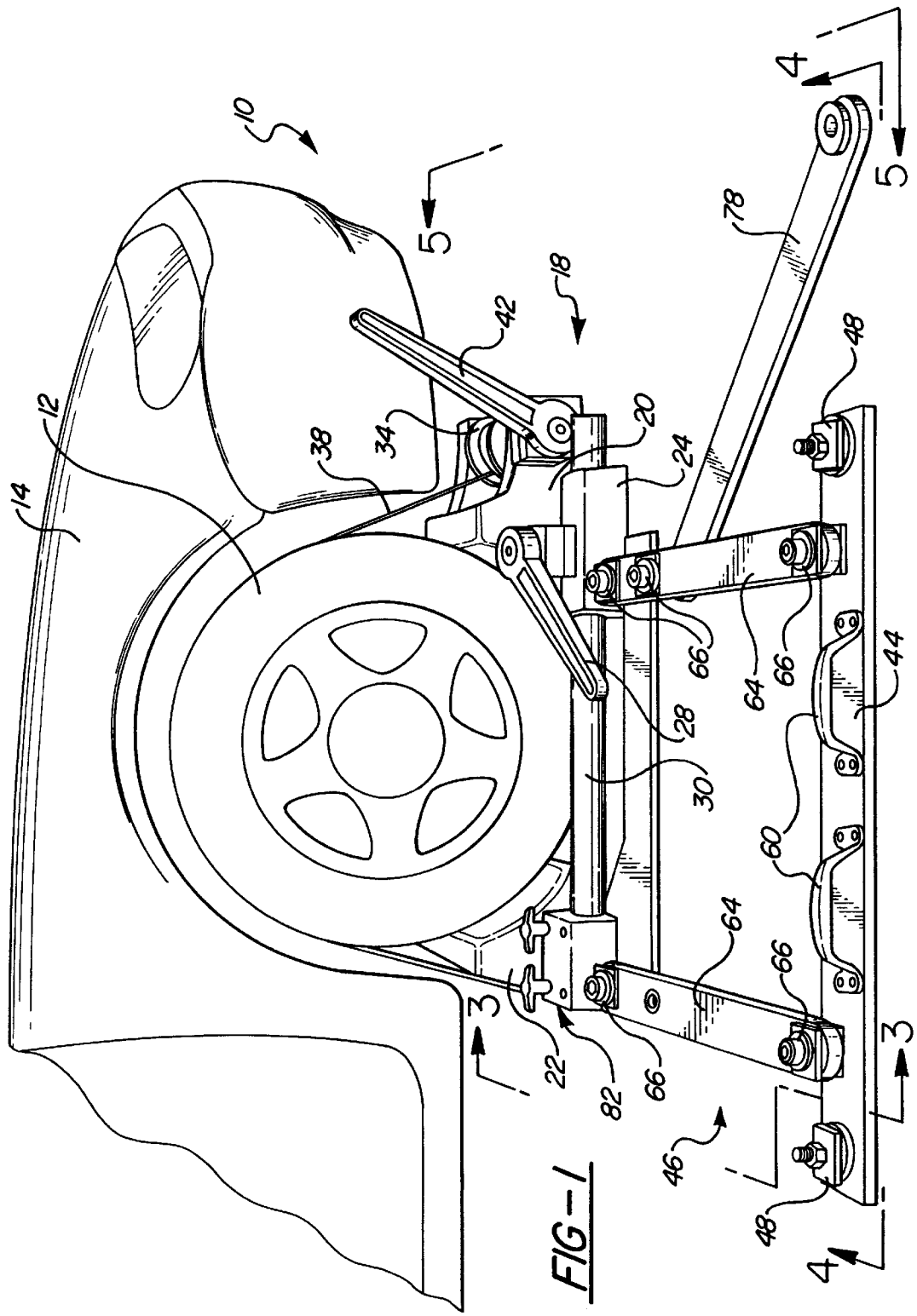
FIG. 1 is a perspective view of a wheel restraint assembly engaging a wheel of a vehicle.

Referring to the Figures, wherein like numerals indicate like or corresponding parts throughout the several views, a wheel restraint assembly for securing a wheel 12 of a vehicle 14 to a test platform 16 is generally shown at 10 in FIG. 1. As discussed in the background section, test platforms 16 are typically used for performance runs and durability runs which measure and record a desired characteristic of the vehicle 14 being tested. A dynamometer (not shown) is commonly used to provide these measurements. The restraint assembly 10 of the subject invention is preferably designed to secure passenger automobiles, such as compact cars, mid size cars, full size sedans, sports cars, sport utility vehicles, and light and heavy duty trucks, to the platform 16. However, the restraint assembly 10 may be designed to adequately secure any type of vehicle without deviating from the scope of the subject invention. As appreciated, in a typical testing operation, two wheel restraint assemblies 10 will be used, one for the drivers side wheel and one for the passengers side wheel.

Figure 2:
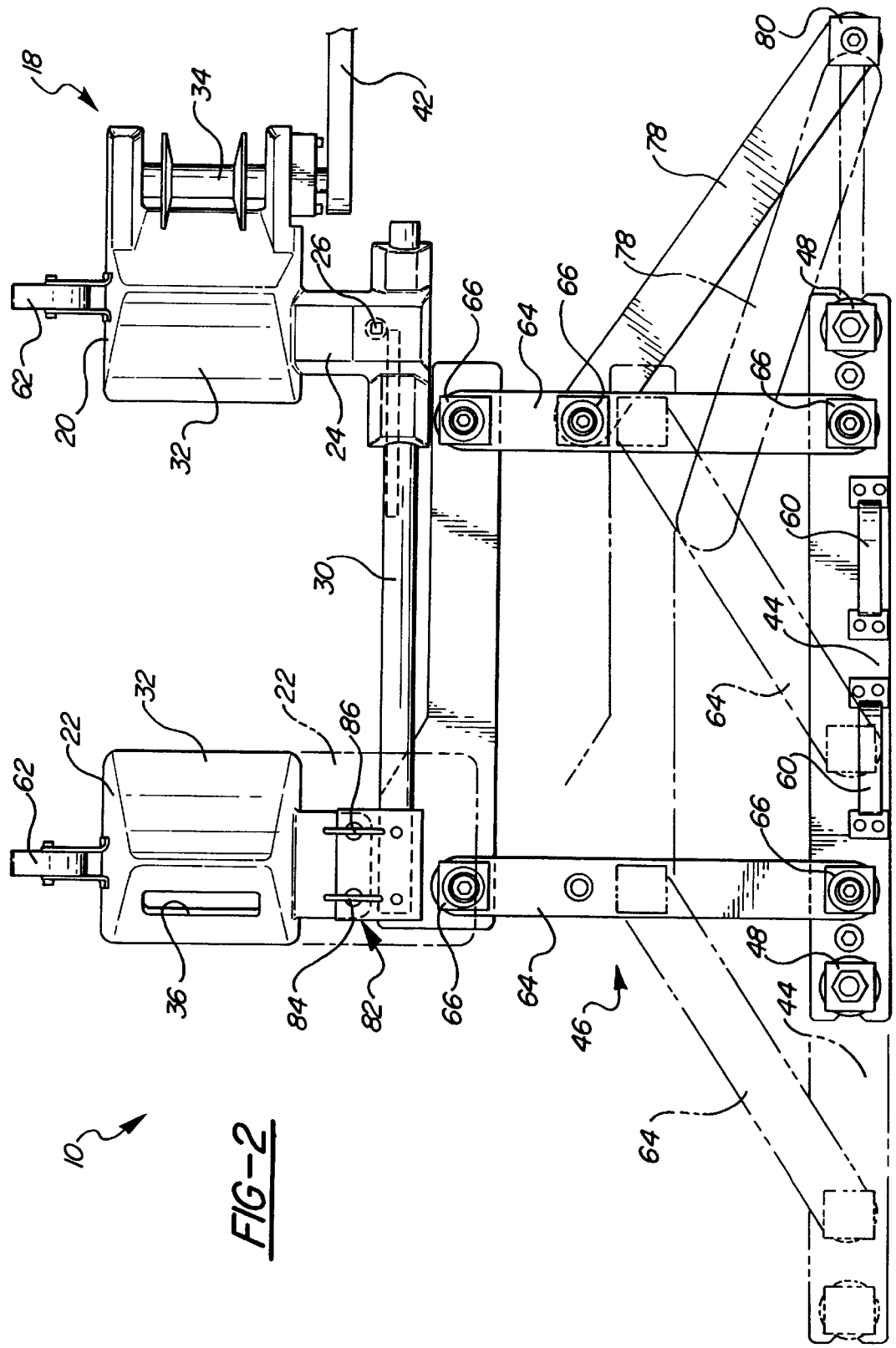
FIG. 2 is a top view of the wheel restraint assembly.
Figure 5:
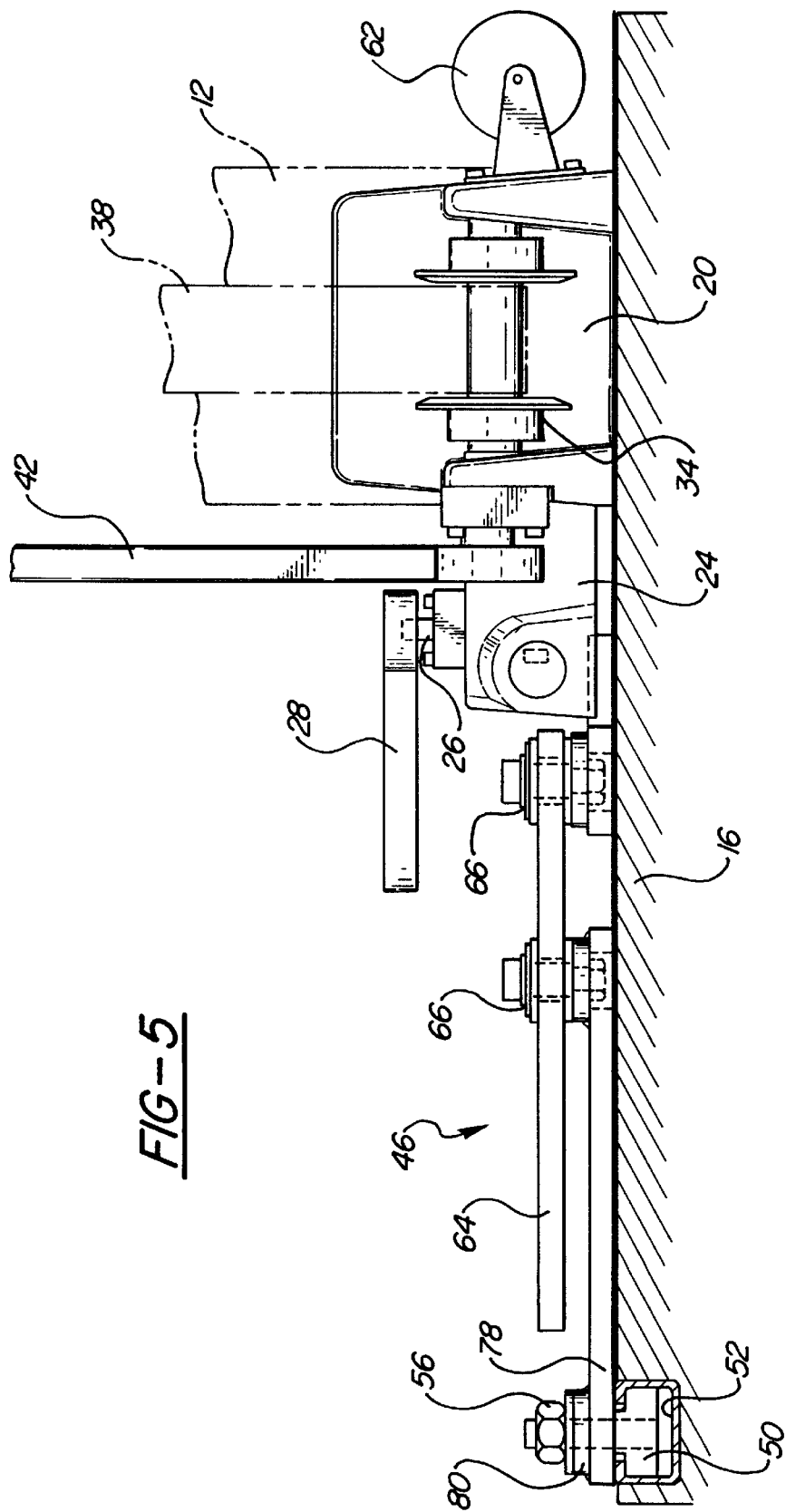
FIG. 5 is a partial cross-sectional side view of the wheel restraint assembly taken along line 5—5 of FIG. 1.

The restraint assembly 10 comprises a wheel chock mechanism, generally shown at 18, having a pair of chocks 20, 22 for selective engagement with the wheel 12 of the vehicle 14 to secure the vehicle 14 to the platform 16. Referring also to FIG. 2 and the selective side views of FIGS. 3 through 5, the pair of chocks 20, 22 of the chock mechanism 18 include a front chock 20 and a rear chock 22. The designation of a "front" and "rear" chock is purely for illustrative purposes. As appreciated, the wheel chock mechanism 18 may be turned around such that the front chock 20 would be a rear chock and the rear chock 22 would be a front chock. Preferably, there are drivers side and passenger side wheel chock mechanisms 18 which correspond to the drivers side wheel and the passenger side wheel.

The chock mechanism 18 includes a sizing apparatus 24 interconnecting the front 20 and rear 22 chocks for incrementally moving the front 20 and rear 22 chocks inwardly and outwardly to accommodate different sized wheels 12. The sizing apparatus 24 of the subject invention includes a rack and pinion gearing mechanism (not numbered) which is shown in phantom in FIG. 2. A square nut 26 extends outwardly from the gearing mechanism for engagement with a sizing lever 28. For illustrative purposes, the sizing lever 28 is not shown in FIG. 2. A tubular housing 30 surrounds and protects the gearing mechanism.

Preferably, the front 20 and rear 22 chocks are substantially triangular with curved inner surfaces 32. As appreciated, the curved inner surfaces 32 are designed such that the wheel chocks 20, 22 will substantially follow the curvature of the wheel 12. The front chock 20 includes a winch 34 and the rear chock 22 includes an opening 36. A wheel strap 38 has a first end retractably mounted to the winch 34 and a second end having a hook 40 for engagement with the opening 36 within the rear chock 22. A winch lever 42 is mounted to the winch 34 for winding and unwinding the wheel strap 38. Triangular wheel chocks which are designed to fit different sized wheels 12 are well known in the art. In addition, the use of a winch and wheel 12 strap to secure the wheel 12 has been practiced by the industry for a number of years.

A mount 44 is attached to the test platform 16 at some distance away from the chock mechanism 18. The restraint assembly 10 is characterized by an adjustment mechanism, generally shown at 46, interconnecting the chock mechanism 18 and the mount 44 for laterally and transversely moving the chock mechanism 18 in an arcuate path relative to the mount 44. The adjustment mechanism 46 is discussed in greater detail below.

The mount 44 includes at least one anchoring device 48 moveable between first and second positions wherein the first position of the anchoring device 48 allows the mount 44 to move relative to the test platform 16 for additional adjustment of the chock mechanism 18 and the second position of the anchoring device 48 fixedly secures the mount 44 to the test platform 16. As illustrated, there are two anchoring devices 48 secured to the mount 44. As shown in FIG. 2, the mount 44 can move side to side or parallel with the chock mechanism 18. This side to side movement of the mount 44 moves the chock mechanism 18 inward and outward relative to the mount 44 as is shown by the phantom position of the restraint assembly 10.

Referring more specifically to FIGS. 3 and 4, the anchoring device 48 includes a T-shaped bolt 50 for selective engagement with a C-shaped slot 52 within the test platform 16. For illustrative purposes, the T-shaped bolt 50 is not shown in FIG. 3 and the bolts 50 are shown perspectively in FIG. 4. The C-shaped slot 52 is disposed within a channel (not numbered) dug into the test platform 16. As appreciated, there is one C-shaped slot 52 disposed within a channel on the drivers side of the vehicle 14 and one C-shaped slot 52 disposed within a channel on the passengers side of the vehicle 14 in order to receive the bolts 50 form each of the wheel restraint assemblies 10.

The slot 52 has a pair of inwardly projecting flanges 54 which reduce the width of the top of the slot 52. The T-shaped bolts 50 are substantially rectangular with outwardly projecting ends. The bolts 50 are positioned parallel to the slot 52 such that the ends of the T-shaped bolts 50 can engage the inner surface of the flanges 54. The slot 52 is deep enough so that the bolts 50 can move up and down within the slot 52. The T-shaped bolts 50 have a threaded shaft extending upwardly through the mount 44 for engagement with a nut 56. There may be a number of washers or spacers disposed between the mount 44 and the nut 56 as are necessary to effectuate proper operation of the anchoring devices 48. To adjust the mount 44, a user simply loosens the nut 56 which allows the bolt 50 to disengage with the flanges 54. The bolts 50 can now slide within the slot 52 which in turn slides the mount 44. A pair of bearings 58 are also mounted to the mount 44 and extend into the slot 52. The bearings 58 selectively engage the sides of the flanges 54 of the slot 52 to assist in the movement of the mount 44 within the slot 52. The mount 44 may be removed from the test platform 16 by removing the bolts 50 from the slots 52 by any suitable means.

The mount 44 also includes at least one handle 60 for adjusting the position of the mount 44. As illustrated, two handles 60 are shown positioned in the center of the mount 44. The adjustment of the mount 44 may be to facilitate additional adjustment of the adjustment mechanism 46 or may be to lift and transport the entire restraint assembly 10. Specifically, castors 62 are rotatably mounted to one side of the front 20 and rear 22 chocks. The handles 60 and castors 62 provide an efficient means for moving the restraint assembly 10. A user can lift upwardly on the handles 60 which lifts the mount 44 upwardly. As appreciated, the anchoring device 48 must first be released from the test platform 16 before the mount 44 can be lifted. The upward movement of the mount 44 lifts the adjustment mechanism 46 upwardly and tilts the wheel chocks 20, 22. The upward lifting and tilting of the wheel chocks 20, 22 is continued until each of the castors 62 engages a support surface, i.e., the test platform 16. The restraint assembly 10 may now be wheeled about the test platform 16 or any other desirable surface.

The adjustment mechanism 46 is now discussed in greater detail. The adjustment mechanism 46 comprises at least one link arm 64 with a first end mounted to the chock mechanism 18 and a second end mounted to the mount 44. Preferably, the adjustment mechanism 46 comprises two parallel link arms 64 interconnecting the chock mechanism 18 and the mount 44. Referring to FIG. 2, the link arms 64 can move between a first position perpendicular to the chock mechanism 18 and the mount 44 (the solid lines) and a second position angled with respect to the chock mechanism 18 and the mount 44 (the phantom lines). The link arm 64 of the adjustment mechanism 46 incrementally moves the wheel chocks 20, 22 between a non-use position with the wheel chocks 20, 22 out of engagement with the wheel 12 of the vehicle 14 (phantom lines) and an operating position with the wheel chocks 20, 22 engaging the wheel 12 of the vehicle 14 and restraining the wheel 12 of the vehicle 14 to the test platform 16 (solid lines). The specific range of movement for the adjustment mechanism 46 and chock mechanism 18 will depend upon the wheel size and width of the vehicle 14.

The first and second ends of the link arm 64 each include a self-locking joint 66. Referring also to FIG. 7, the self-locking joints 66 include a biasing spring 68 sandwiched between a nut 70 and the link arm 64 such that compression of the spring 68 creates sufficient frictional forces between the first end of the link arm 64 and the chock mechanism 18 and the second end of the link arm 64 and the mount 44 to retard any movement of the link arm 64 from a desired position. The self-locking joint 66 shown in FIG. 7 is disposed on the first end of the link arm 64 and the chock mechanism 18. The self-locking joint 66 on the second end of the link arm 64 and the mount 44 is substantially identical. The biasing spring 68 is preferably a belleville washer 68. As appreciated by those skilled in the art, the biasing spring 68 may be of any suitable design or configuration so long as sufficient frictional forces are created. The belleville washer 68 rides on a first flat washer 72 which engages the top surface of the first end of the link arm 64. A second flat washer 74 engages the bottom surface of the link arm 64. A bushing 76 is wedged between the second flat washer 74 and the chock mechanism 18. Preferably, the bushing 76 is welded or otherwise affixed to the chock mechanism 18.

Referring back to FIGS. 1, 2, 4 and 5, a locking member 78 is shown having first and second ends for selectively preventing the chock mechanism 18 from moving relative to the mount 44. The second end of the locking member 78 includes at least one securing device 80 moveable between first and second positions wherein the first position of the securing device 80 allows the locking member 78 to move relative to the test platform 16 during the movement of the chock mechanism 18 and the second position of the securing device 80 fixedly secures the locking member 78 and the chock mechanism 18 to the test platform 16. The securing device 80 is substantially similar to the anchoring devices 48 of the mount 44. In other words, the securing device 80 includes a T-shaped bolt 50 for engagement with the same C-shaped slot 52 within the test platform 16. Similarly, the bolt 50 is substantially rectangular with outwardly projecting ends and has a threaded shaft extending upwardly for engagement with a nut 56.

The adjustment of the chock mechanism 18 discussed above and referred to in FIG. 2 is a first means of adjustment. Specifically, this first means of adjustment moves the chock mechanism 18 inwardly and outwardly in relation to the mount 44. A second means of adjustment operates in conjunction with the locking member 78. During the second means of adjustment the mount 44 remains fixed to the test platform 16. A user only loosens the securing device 80 of locking member 78 and then slides the locking member 78 within the C-shaped slot 52 of the test platform 16. The sliding movement of the locking member 78 adjusts the adjustment mechanism 46 and the chock mechanism 18. Specifically, the chock mechanism 18 moves laterally and transversely in an arcuate path relative to the mount 44. This second means of adjustment can work independently or in conjunction with the first means of adjustment.

The locking member 78 translates a majority of the longitudinal forces from the wheel 12 of the vehicle 14 to the test platform 16. Specifically, the forces from the wheel 12 of the vehicle 14 are transmitted to the front 20 and rear 22 wheel chocks. Depending on the mode of testing, one of the front 20 or rear 22 chocks may absorb more forces than the other. The forces pass into the sizing apparatus 24 and then to the self-locking joints 66 on the first ends of the link arms 64. Some of the forces are translated to the second end of the link arms 64, into the mount 44, and then to the test platform 16. The majority of the forces are translated to the locking member 78. Specifically, the first end of the locking member 78 is pivotally mounted to the link arm 64 of the adjustment mechanism 46 to pivotally move in response to the movement of the chock mechanism 18. The first end of the locking member 78 also includes a self-locking joint 66. The self-locking joint 66 of the locking member 78 is substantially identical to the self-locking joints 66 of the adjustment mechanism 46.

The locking member 78 extends outwardly from the link arm 64 at a predetermined angle. This is necessary in order to absorb the large stresses translated from the wheel chock mechanism 18. Accordingly, the forces from the link arm 64 extend into the self-locking joint 66 of the locking member 78, into the first end of the locking member 78, through the locking member 78 to the second end, into the securing device 80 and then to the test platform 16. The position and angle of the locking member 78 is critical to ensure proper support for the chock mechanism 18.

Referring to FIG. 6, a pivoting device, generally shown at 82, is mounted to the rear chock 22 such that the rear chock 22 may pivot outwardly to provide for removal and replacement of the wheel 12 between the front 20 and rear 22 chocks. The pivoting device 82 includes a pivot pin 84 and a locking pin 86 whereby removal of the locking pin 86 from the rear chock 22 allows the rear chock 22 to pivot about the pivot pin 84. The pivoting rear chock 22 provides an efficient means for interchanging vehicles without adjusting the entire restraint assembly 10. This is especially useful when conducting numerous tests on the same type or size of vehicle. As appreciated, the pivot pin 84 may also be removed such that the rear chock 22 may be removed entirely from the wheel chock mechanism 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be any way limiting, the invention may be practiced otherwise than as specifically described.

What is claimed is:

1. A restraint assembly (10) for securing a wheel (12) of a vehicle (14) to a test platform (16), said assembly comprising:

a wheel chock mechanism (18) including a pair of chocks (20,22) for selective engagement with the wheel (12) of the vehicle (14); and a mount (44) for attachment to the test platform (16);

said assembly characterized by an adjustment mechanism (46) interconnecting said chock mechanism (18) and said mount (44) for laterally and transversely moving said chock mechanism (18) in an arcuate path relative to said mount (44).

2. An assembly as set forth in claim 1 further including a locking member (78) having first and second ends with said first end mounted to one of said chock mechanism (18) and said adjustment mechanism (46) and said second end adapted for attachment to the test platform (16) wherein said locking member (78) selectively prevents said chock mechanism (18) from moving relative to said mount (44).

3. An assembly as set forth in claim 1 wherein said mount (44) includes at least one anchoring device (48) moveable between first and second positions wherein said first position of said anchoring device (48) allows said mount (44) to move with respect to the test platform (16) for additional adjustment of said chock mechanism (18) and said second position of said anchoring device (48) fixedly secures said mount (44) to the test platform (16).

4. An assembly as set forth in claim 3 wherein said mount (44) includes at least one handle (60) for adjusting a position of said mount (44).

5. An assembly as set forth in claim 3 wherein said anchoring device (48) includes a T-shaped bolt (50) for selective engagement with a C-shaped slot (52) within the test platform (16).

6. An assembly as set forth in claim 5 wherein said T-shaped bolt (50) has a threaded shaft extending upwardly through said mount (44) for engagement with a nut (56).

7. An assembly as set forth in claim 2 wherein said second end of said locking member (78) includes at least one securing device (80) moveable between first and second positions wherein said first position of said securing device (80) allows said locking member (78) to move relative to the test platform (16) during said movement of said chock mechanism (18) and said second position of said securing device (80) fixedly secures said locking member (78) and said chock mechanism (18) to the test platform (16).

8. An assembly as set forth in claim 7 wherein said adjustment mechanism (46) comprises at least one link arm (64) with a first end mounted to said chock mechanism (18) and a second end mounted to said mount (44).

9. An assembly as set forth in claim 7 wherein said adjustment mechanism (46) comprises two parallel link arms (64) interconnecting said chock mechanism (18) and said mount (44).

10. An assembly as set forth in claim 8 wherein said first and second ends of said link arm (64) each include a self-locking joint (66).

11. An assembly as set forth in claim 10 wherein said self-locking joints (66) include a biasing spring (68) sandwiched between a nut (70) and said link arm (64) such that compression of said spring (68) creates sufficient frictional forces between said first end of said link arm (64) and said chock mechanism (18) and said second end of said link arm (64) and said mount (44) to retard any movement of said link arm (64) from a desired position.

12. An assembly as set forth in claim 11 wherein said biasing spring (68) is a belleville washer (68).

13. An assembly as set forth in claim 8 wherein said first end of said locking member (78) is pivotally mounted to said link arm (64) of said adjustment mechanism (46) to pivotally move in response to said movement of said chock mechanism (18).

14. An assembly as set forth in claim 13 wherein said first end of said locking member (78) includes a self-locking joint (66).

15. An assembly as set forth in claim 14 wherein said locking member (78) extends outwardly from said link arm (64) at a predetermined angle.

16. An assembly as set forth in claim 1 wherein said pair of chocks (20,22) of said chock mechanism (18) include a front chock (20) and a rear chock (22).

17. An assembly as set forth in claim 16 wherein said chock mechanism (18) includes a sizing apparatus (24) interconnecting said front (20) and rear (22) chocks for incrementally moving said front (20) and rear (22) chocks inwardly and outwardly to accommodate different sized wheels.

18. An assembly as set forth in claim 17 further including castors (62) rotatably mounted to said front (20) and rear (22) chocks.

19. An assembly as set forth in claim 16 further including a pivoting device (82) mounted to said rear chock (22) such that said rear chock (22) may pivot outwardly to provide for removal and replacement of the wheel (12) between said front (20) and rear (22) chocks.

20. An assembly as set forth in claim 19 wherein said pivoting device (82) includes a pivot pin (84) and a locking pin (86) whereby removal of said locking pin (86) from said rear chock (22) allows said rear chock (22) to pivot about said pivot pin (84).

21. An assembly as set forth in claim 17 wherein said front (20) and rear (22) chocks are substantially triangular with curved inner surfaces (32).

22. An assembly as set forth in claim 21 wherein said front chock (20) includes a winch (34) and said rear chock (22) includes an opening (36).

* * * * *